(12) United States Patent
Gatto et al.

(10) Patent No.: US 6,732,920 B2
(45) Date of Patent: May 11, 2004

(54) COMPACT DOCUMENT SCANNER WITH BRANDING

(75) Inventors: Jean-Marie Gatto, London (GB); Thierry Brunet De Courssou, Palo Alto, CA (US)

(73) Assignee: Cyberscan Technology, Inc., Palo Alto, CA (US)

( * ) Notice: Subject to any disclaimer, the term of this patent is extended or adjusted under 35 U.S.C. 154(b) by 145 days.

(21) Appl. No.: 09/782,839

(22) Filed: Feb. 14, 2001

(65) Prior Publication Data

US 2002/0109865 A1 Aug. 15, 2002

(51) Int. Cl.7 .................................................. G06F 7/08
(52) U.S. Cl. ........................ 235/381; 235/380; 235/375; 358/296; 358/476; 347/171
(58) Field of Search ................... 235/380, 375, 235/381, 486; 358/296; 347/141, 197

(56) References Cited

U.S. PATENT DOCUMENTS

| | | | | |
|---|---|---|---|---|
| 4,635,130 A | * | 1/1987 | Oi | 358/296 |
| 4,855,756 A | * | 8/1989 | Gluck et al. | 347/197 |
| 5,109,153 A | * | 4/1992 | Johnsen et al. | 235/468 |
| 5,495,277 A | * | 2/1996 | Imamura et al. | 347/171 |
| 5,676,363 A | * | 10/1997 | Kishida et al. | 271/10.01 |
| 6,107,913 A | | 8/2000 | Gatto et al. | |
| 6,147,777 A | * | 11/2000 | Jung | 358/473 |
| 6,236,471 B1 | * | 5/2001 | Lee | 358/474 |
| 6,273,817 B1 | | 8/2001 | Sultan | |
| 6,357,658 B1 | | 3/2002 | Garczynski et al. | |
| 6,419,157 B1 | * | 7/2002 | Ehrhart et al. | 235/486 |
| 6,473,812 B2 | * | 10/2002 | Motoyama | 710/15 |

* cited by examiner

*Primary Examiner*—Thien M. Le
*Assistant Examiner*—Allyson N. Sanders
(74) *Attorney, Agent, or Firm*—Young Law Firm, P.C.

(57) ABSTRACT

A document image scanner capable of branding thermally printed tickets using a single feed roller. The contact image sensor and the thermal print head are both configured to apply pressure directly against the single feed roller. When not in use, the thermal print head may be retracted. The document scanner may include a print head that is wider than the document to be scanned, thereby enabling the scanner to relatively insensitive to off centered and/or skewed documents inserted therein for scanning and/or branding.

20 Claims, 11 Drawing Sheets

COMPACT DOCUMENT SCANNER WITH BRANDING

BACKGROUND OF THE INVENTION

1. Field of the Invention

The invention generally pertains to the field of document image scanners and ticket scanning terminals.

2. Description of the Related Art

Branding of tickets is a technique commonly used in lottery systems to make permanent markings on lottery tickets after a prize has been claimed. Branding, therefore, prevents the same ticket from being presented for payment more than once. Conventionally, tickets printed on ordinary ticket paper are branded using impact printers by inking the ticket or through or other mechanical methods, such as punched holes.

Branding of tickets printed on thermal ticket paper (an often thin and insubstantial form of paper) is typically carried out using a scanner having a printer that features a thermal head placed a distance away from the scanner feed roller. This configuration, however, requires a complex and expensive paper transport mechanism having multiple feed rollers. What is needed, therefore, is an improved document scanner having branding functionality. More particularly, what is needed is an improved document scanner that is configured to brand documents (such as lottery and other gaming tickets for example) and that requires only a single feed roller for both the scanner and the print head. What is also required is a branding document scanner that is configured to correct for skewed and off-centered documents inserted therein.

SUMMARY OF THE INVENTION

It is an object of the present invention, therefore, to provide an improved document scanner having branding functionality. It is another object of the present invention to provide an improved document scanner that is configured to brand documents (such as lottery and other gaming tickets for example) and that requires only a single feed roller for both the scanner and the print head. A further object of the present invention is to provide a branding document scanner that is configured to correct for skewed and off-centered documents inserted into the scanner.

In accordance with the above-described objects and those that will be mentioned and will become apparent below, a document image scanner, according to an embodiment of the present invention, comprises a feed roller; an image sensor adapted to sense an image of a document inserted in the scanner while pressing the document against the feed roller; and a printer adapted to print an indicium (or indicia) on the document while pressing the document against the feed roller.

According to further embodiments, the printer may be adapted to selectively assume a printing position in which the printer is positioned to print the indicium on the document and a non-printing position away from the printing position. The feed roller may be adapted to feed the document to both the image sensor and to the printer. The image sensor may be or may include a contact Image Sensor (CIS). The printer may be or may include a thermal print head. The printer may include a print head that is wider than the document inserted in the document scanner. The printer may be pivotally coupled to a hinge and the document may be caused to at least partially wrap around the feed roller when the printer is pivoted to the printing position. The document may be substantially tangent to an outer surface of the feed roller when the printer is pivoted to the non-printing position. The document may include an initially machine readable marking thereon and the indicium printed by the printer may render the marking unreadable.

The present invention is also a method of capturing an image of a document and branding the document, comprising the steps of scanning the image of the document while pressing the document against a feed roller and branding the document by printing an indicium thereon while pressing the document against the feed roller. The document may be a gaming ticket that includes an initially machine readable marking thereon and the branding step may render the marking unreadable.

The present invention is also a document image scanner comprising a feed roller, an image sensor and a printer, in which both the image sensor and the printer apply pressure against the (same) feed roller when the printer is in operation.

According to further embodiments, the printer may be adapted to selectively assume a printing position in which the printer is positioned to print an indicium on a document inserted in the document image scanner and a non-printing position away from the printing position. The same feed roller is configured to feed a document inserted into the document image scanner to both the image sensor and to the printer. The image sensor may include a Contact Image Sensor (CIS), for example. The printer may include, for example, a thermal print head. The printer may include a print head that is wider than the document (or wider than a printable area on the document) inserted in the document scanner. The printer may be pivotally coupled to a hinge and the document may be caused to at least partially wrap around the feed roller when the printer is pivoted to the printing position. The document may be substantially tangent to the outer surface of the feed roller when the printer is pivoted to non-printing position. The document may include an initially machine readable marking thereon and the indicium printed by the printer may render the marking unreadable.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE INVENTION

Figure 1:
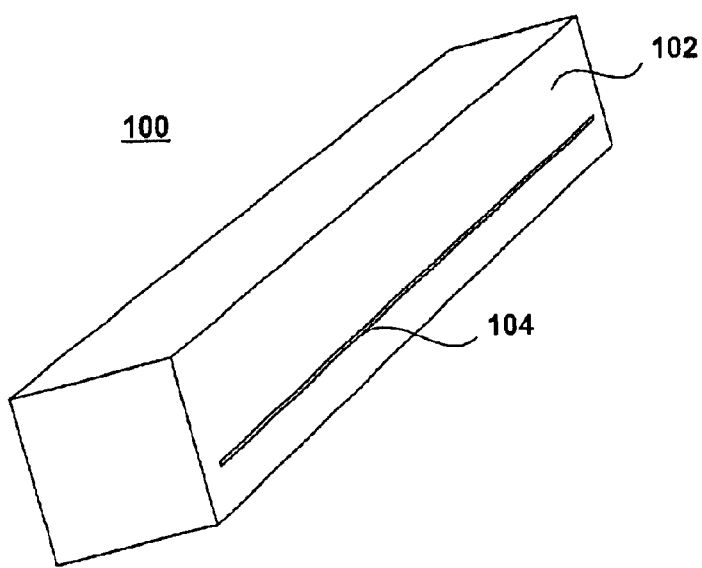
FIG. 1 shows a Contact Image Sensor (CIS) suitable for use in the present invention.

FIG. 1 shows a Contact Image Sensor (CIS) 100 suitable for use in the present invention. A CIS includes an optical line 104 and a glass panel 102 to protect the optical line 104. The optical line 104 includes a linear array of sensing elements. As is known, a CIS operates by illuminating the document to be scanned with a bright light source through the glass panel 104. The sensing elements of the optical line 104 sense the intensity of the reflected light and create a corresponding serial stream of pixels, as the CIS scans the document and captures the image thereof one line at a time as the document is fed over the optical line 104 of sensing elements. Processing means within the CIS capture this serial of pixels and derive a 2 dimensional (2-D) image therefrom. In a CIS, the optical line 104 must be in close contact with the document to be scanned. This is carried out by causing the glass panel 102 of the CIS 100 to apply a predetermined amount of pressure on the document to be scanned.

Figure 2:
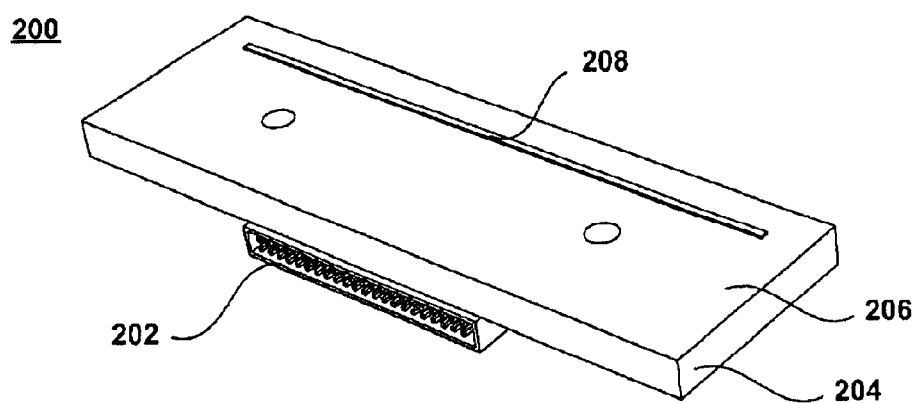
FIG. 2 shows a thermal print head suitable for use in the present invention.

FIG. 2 shows a thermal print head 200 suitable for use with the present invention. As shown, the thermal print head 200 may include a connector 202, a radiator portion 204 (advantageously formed of or including aluminum), a ceramic substrate 206 and a thermal line 208. The operation of a thermal print head 200 is somewhat similar to that of the CIS. Indeed, processing means within the thermal print head 200 take a 2D image of the image to be printed and transform it into a serial stream of pixels. Each pixel is then assigned a "hot" or "cold" value, depending upon the intensity thereof. When a line of pixels is ready, energy is applied to the thermal line 208 of the thermal print head 200. The application of heat to the thermal line 208 according to the assigned "hot" or "cold" value of the pixels results in heat being transferred to the thermal paper, which turns black where heat has been applied. The thermal paper is then further advanced and the next line of pixels of the serial stream causes the selective application of energy to the thermal line 208 to selectively apply heat to and blacken the thermal paper. In similar fashion to the CIS, the thermal line 208 must be in close proximity to the document to be printed. This is achieved by causing the thermal line 204 of the thermal print head 200 to maintain a predetermined pressure with the document to be printed.

Figure 3:
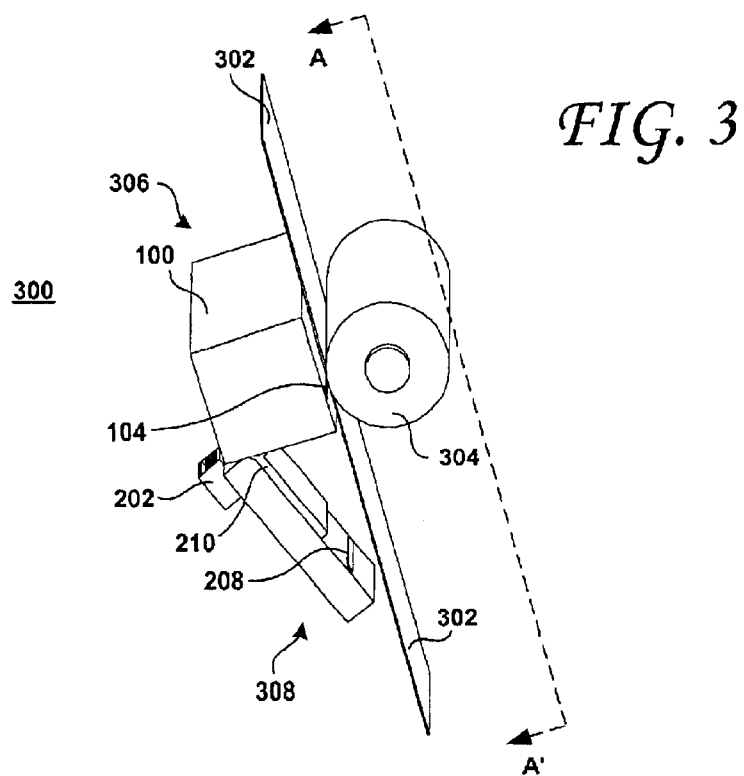
FIG. 3 shows a perspective view of the printing and scanning mechanism of a document scanner according to the present invention, wherein the printing and scanning mechanism is in the document scanning mode.
Figure 4:
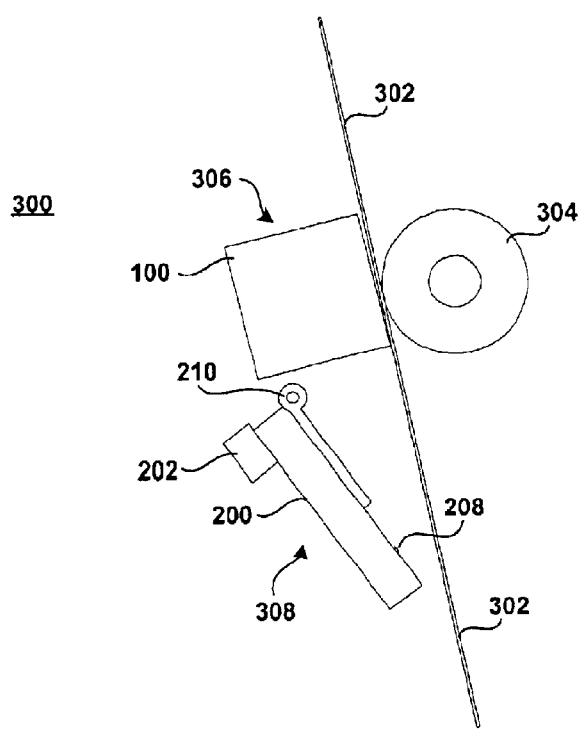
FIG. 4 shows a cross-section of the printing and scanning mechanism, taken along cross-sectional line AA' of FIG. 3.

FIGS. 3 and 4 show a perspective view and a cross-sectional view, respectively, of the scanning and branding mechanism of a document scanner according to the present invention, wherein the mechanism is in the document scanning mode. A document 302 (a document made of thermal print paper, for example) is shown in both FIGS. 3 and 4, although the document 302 itself forms no part of the present invention. According to the present invention, the scanning and branding mechanism 300 includes a feed roller 304. The feed roller 304 takes the document 302 inserted within the scanner housing (not shown) and feeds it past an optical line of an image sensor 306, such as past the optical line 104 of the CIS 100, where an image of the document 302 (or selected portions thereof) is acquired as the document 302 is pulled or pushed by the feed roller 304 across the optical line 104. The feed roller 304 and the image sensor 306 are configured and mutually arranged such that the image sensor 306 presses the document 302 against the feed roller 304. The scanning and branding mechanism 300 according to the present invention also includes a printer 308. The printer 308 may include a thermal print head 200, as shown in FIG. 2.

The mechanism 300 of FIG. 3, is in a document scanning only mode, wherein the printer 308 is not used and is moved away (retracted) from the document 302 and the document feed path (the path followed by the document 302 as it is pulled across the image sensor 306 and the printer 308). As shown in both FIGS. 3 and 4, the document 302 may follow a substantially straight path that is substantially tangent to the surface of the feed roller 304 as it is scanned by the image scanner 306. The printer 308, including the thermal print head 200, is advantageously provided with and mounted to a hinge 210. The hinge 210 is attached to the thermal print head 200 to allow the head 200 to pivot about a pivot axis that is parallel (or substantially parallel) to the rotational axis of the feed roller 304. According to an embodiment of the present invention, branding may be carried out using a retractable motorized thermal print head 200 that is configured to press against the same feed roller 304 that the CIS 100 presses against. Although not essential, motorized retraction of the thermal print head 200 is preferred. Motorized retraction enables reliable and automatic introduction of the document such as a thermal paper lottery or gaming ticket (for example) between the feed roller 304 and the print head 200, as such thermal paper is often thin and flimsy. Retracting the thermal print head 200 away from the document as shown in both FIGS. 3 and 4 clears the document feed path when performing regular scanning.

The exit path for the scanned and/or branded document may be the same path as the scanner input path. Alternatively, the scanner may have separate input and exit guides. The scanner input and exit guides, therefore, are not shown herein. Suitable input guides are disclosed in commonly assigned US patent application entitled "Precision Clip-On Deep Input Guide" filed on Jul. 1, 1999 and assigned Ser. No. 09/340,230, the disclosure of which is incorporated herein in its entirety. The scanning and branding mechanism described and depicted herein may be implemented in a variety of scanners, but finds particular use in high volume environments, such as lottery or gaming establishments or anywhere that a preprinted ticket, voucher, receipt or other document must be scanned and/or somehow marked, validated, dated or otherwise printed upon. The branding scanner according to the present invention may advantageously implement the methods and incorporate the structures described in commonly assigned U.S. Pat. No. 5,973,799 entitled "ID Card Image Reader", as well as the methods and structures detailed in commonly assigned U.S. Pat. No. 6,034,784, entitled "Anti-Skew Auto-Start System for Document Scanners", the disclosures of which being incorporated herein in their entirety.

Figure 8:
FIG. 8 is an illustration of an example of a gaming ticket.

During a branding operation, the document 302 may first be scanned with the thermal print 200 head retracted (FIGS. 3 and 4). Such documents may include some kind of machine-readable code printed thereon. Alternatively, the image obtained from a scanning operation may be processed through an Optical Character recognition (OCR) engine to "read" any text printed on the document. The following, however, will assume that the document to be scanned and/or branded includes a barcode printed thereon. An example of such a document including a barcode is illustrated in FIG. 8, which shows a generic horse race betting ticket. It is to be understood, however, that the present invention is not to be limited thereby, as the present invention is readily adaptable to any type of document that includes any machine-readable code thereon.

Figure 5:
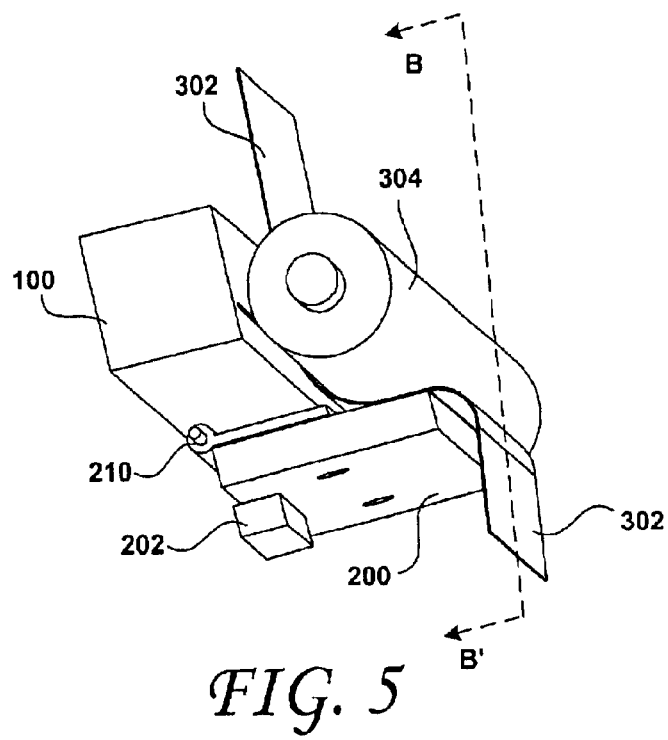
FIG. 5 shows a perspective view of a printing and scanning mechanism of a document scanner according to an embodiment of the present invention, wherein the printing and scanning mechanism is in the document branding mode.
Figure 6:
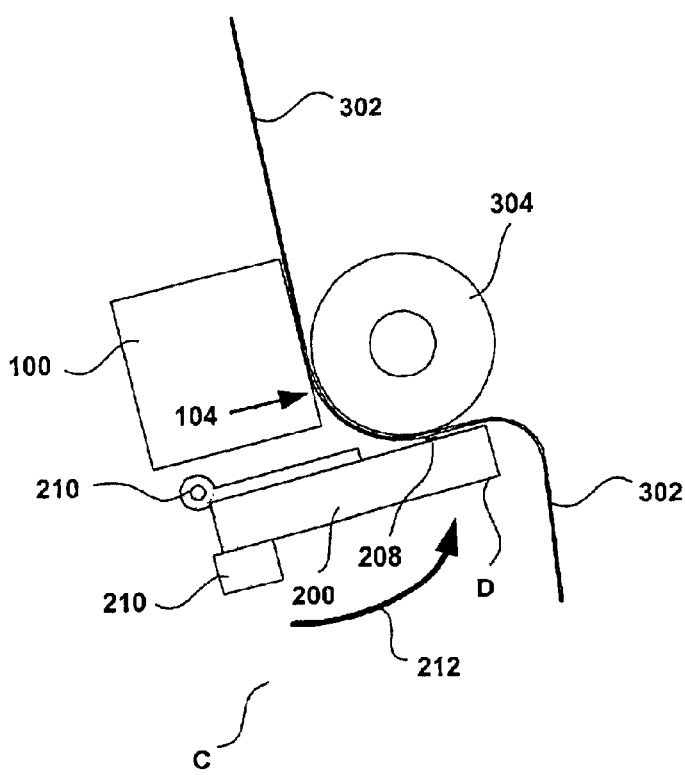
FIG. 6 is a cross sectional view of the printing and scanning mechanism, taken along cross-sectional line BB' of FIG. 5.

After the CIS 100 captures the barcode on the document 302 and the captured barcode is decoded and processed (in known manner), the thermal print head 200 is advanced to its printing position such as its thermal print line 208 presses the document 302 onto the feed roller 304 with a predetermined pressure. This pushes and wraps the document 302 around the feed roller 304 as shown in FIGS. 5 and 6. Unlike conventional scanner and printer combinations, both scanning and branding operations utilize the same feed roller 304. Also unlike conventional scanner and printer combinations, only a single feed roller 304 is needed to carry out both operations. Moreover, the thermal print cycle of the thermal print head 200 may be activated while the feed roller 304 is rotated in either direction, as long as the document 302 is engaged under the thermal print line 208.

As shown in FIG. 6, the thermal print head 200 is configured to assume a non printing position C (shown in dashed lines and also shown FIGS. 3 and 4) and a printing position D in which the thermal print head 200 is able to print on the document 302. To do this, the thermal print head 200 may be pivoted on its hinge 210 about a pivot point in the direction of arrow 212, and back when printing is done. Motor means to advance and retract the thermal print head 200 between positions C and D are not shown.

As shown in FIGS. 5 and 6, the document 302 may be wrapped at least partially around the feed roller 302, approximating an "S" shape. Thermal paper of the kind used for tickets, vouchers, receipts and the like is flexible enough in order to withstand such bending when the thermal print head 200 is activated, without disrupting paper feed and exit. Other mechanisms to advance and retract the head 200 to enable free passage of documents while scanning, and for bringing the head 200 into contact with the feed roller 304 may be used, as those of skill may recognize. All such mechanisms are deemed to fall within the scope of the present invention. Very compact design is possible, as only a single feed roller 304 is used for both the branding/printing and scanning operations.

Figure 7:
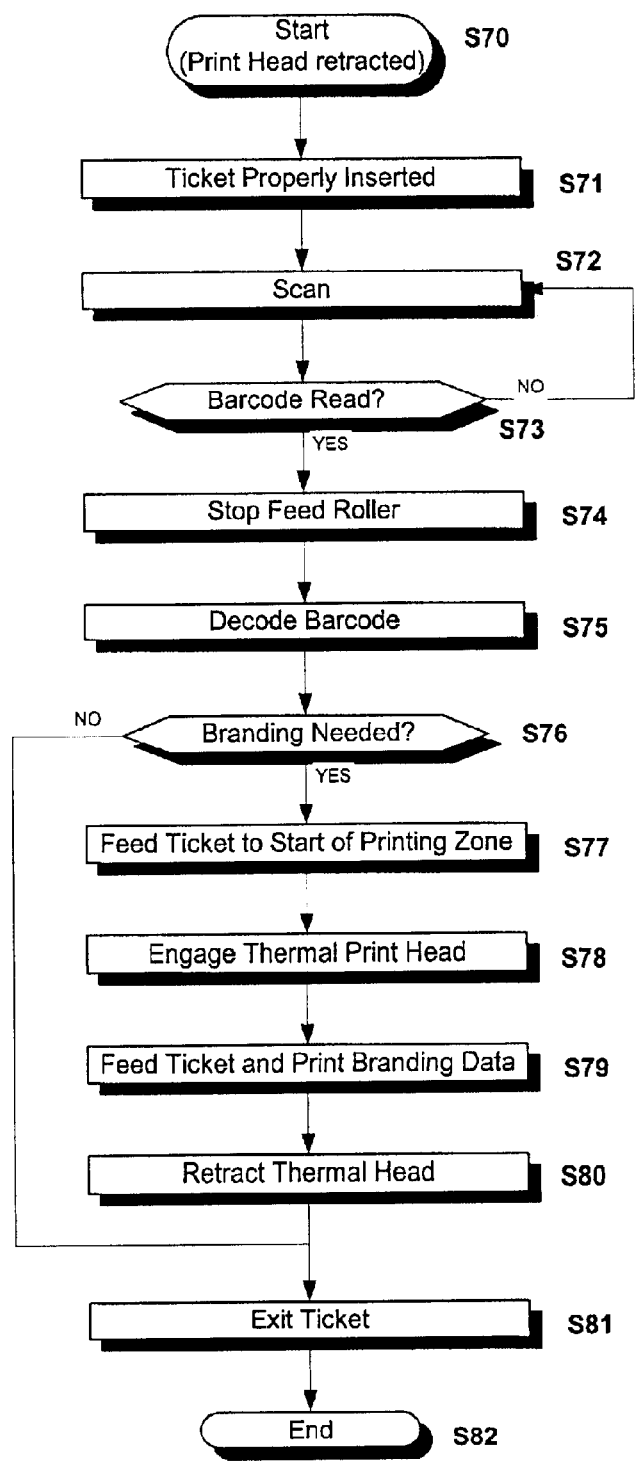
FIG. 7 is a flow chart illustrating an exemplary operation of a document scanner according to the present invention.

FIG. 7 is a flowchart of the method of operation of the branding scanner according to an embodiment of the present invention. As shown therein, the method begins at S70, with the print head 200 retracted (i.e., in the non-printing position shown in FIGS. 3 and 4, moved away from the document 302). The ticket (used generically herein to encompass any document to be scanned and/or branded) is then inserted into the branding scanner of the present invention, as shown at S71. The means detailed in U.S. Pat. No. 6,034,784 may be advantageously implement here to insure proper insertion (without unacceptable skew) of the ticket into the scanner. The ticket is then scanned, as shown at S72, and the barcode (or any other machine-readable code) printed thereon is read and processed, as shown at S73. If the barcode or other machine-readable code is not read, the method reverts to S72. If the branding scanner succeeds in reading the barcode at S73, the feed roller (such as shown at 304) is stopped, as called for by step S74. The feed roller 304 may have begun rotating upon detecting a ticket inserted into the scanner at S71, for example. The barcode or other machine-readable code may then be decoded, as shown at S75. In step S76, it is determined whether any branding and/or printing is needed on the ticket inserted into the branding scanner. For example, a ticket may need to be validated, date-stamped and/or branded in the manner shown in FIG. 11 or 14, for example. If branding of the ticket is required, the feed roller 304 is activated to feed the ticket to the beginning of the printable zone thereon, as shown at S77. For example, the ticket may be advanced so that the thermal line 208 of the thermal print head 200 is aligned with the blank zone 806, as shown in FIG. 8. The thermal print head 200 may then be advanced (pivoted, for example) to its printing position and activated to print and/or brand the ticket, as necessary. The present invention, however, is not limited to a thermal type print head 200, as the printer 308 of the present invention may incorporate most any type of printing technology, with suitable modifications well within the purview of those of skill in this art. The feed roller 304 is engaged as shown at S79, to feed the ticket past the thermal line 208 of the thermal print head 200. As shown at S80, the thermal print head 200 may then be retracted to its non-printing position after the printing and/or branding has been accomplished. After the thermal print head 200 has been retracted (pivoted back) to its non-printing position away from the ticket, the branded ticket may be exited and returned to the operator, as shown at S81. If it is determined that no branding and/or printing is needed in step S76, the method may skip to step S81, whereupon the ticket may be exited from the branding scanner and returned to the operator, as shown at S81. Alternatively, the scanner may be configured to capture and/or destroy an unbranded ticket. The method ends at step S82.

Figure 9:
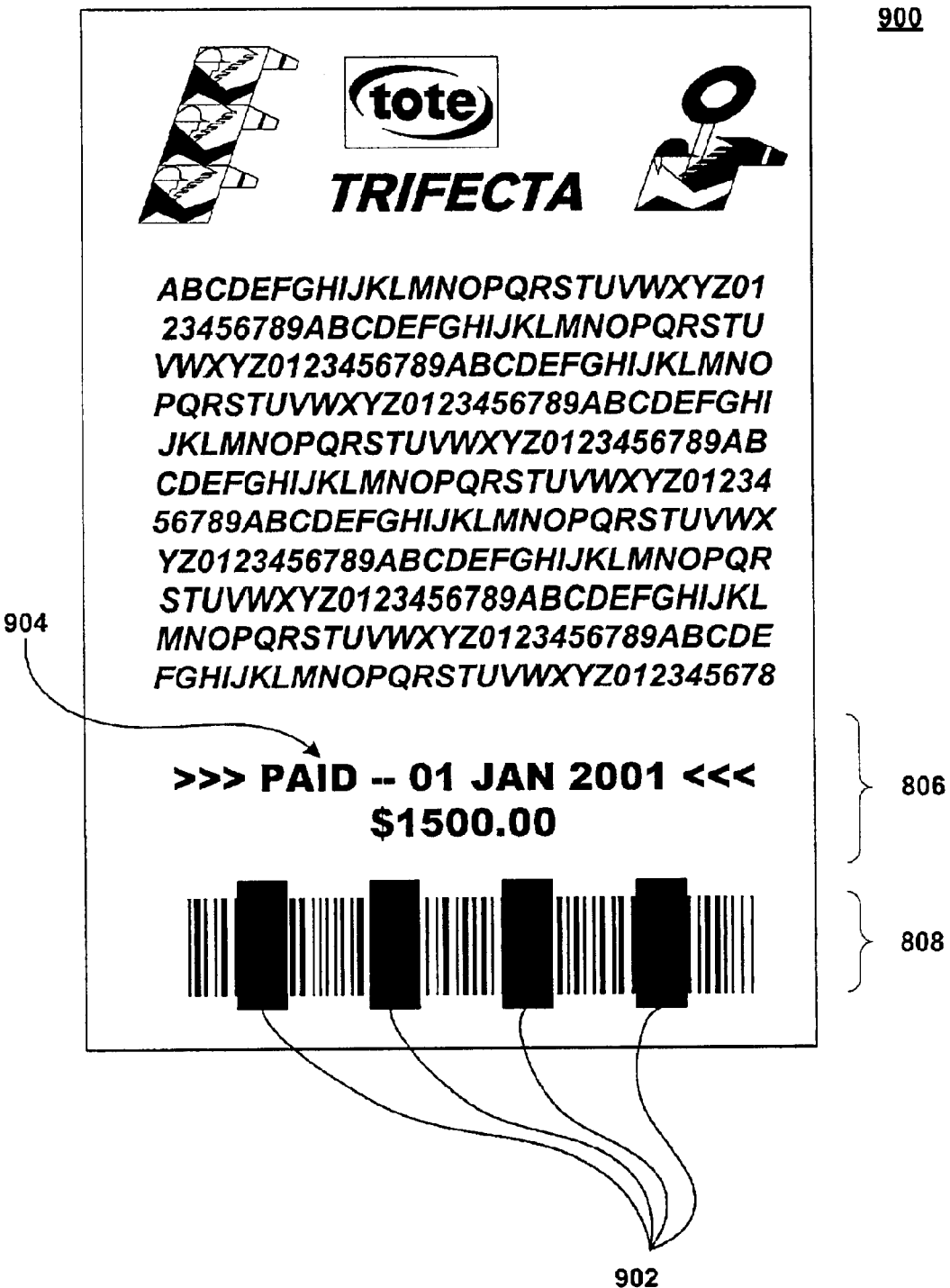
FIG. 9 is an illustration of an example of a branded gaming ticket.

A generic wager ticket 800 printed on thermal paper is shown in FIG. 8. Such a ticket may include a graphics logo area 802, a text zone 804 containing the details of the wager, a machine-readable code 808 (a barcode, OCR numbers & characters, for example) that can be decoded by the scanner processing means, and an optional additional information zone 806 (often blank) used during branding, date-stamping or otherwise marking the ticket. For example, a player may place a bet on a horse race and be given a ticket 800 detailing the date, time, race and horse or horses bet upon. If the player wins, he or she may present the ticket 800 to the claims booth to receive his or her winnings. To insure, among other reasons, that the ticket 800 may only be used once, it may be branded, as shown at 900 in FIG. 9. The branding may include, for example, the printing of some indicium 902 over the barcode 808. Many indicia 902 may be printed on the barcode (or other machine readable code) 808, so as to render it illegible thereafter. As shown in FIG. 9, such indicium may include, for example, thick bars of black ink. Alternatively, branding may include the printing of geometric patterns over the barcode 902 in order to render any subsequent reading of barcode 808 impossible. Moreover, branding may also include the printing of selected information in the blank zone 806, such as "PAID", "VOID", "CANCELLED", the date and/or claimed prize, for example. A branded ticket 900, therefore, has been permanently marked and may not be re-presented for payment.

Figure 10:
FIG. 10 illustrates a thermal print head that is relatively smaller in width than the gaming ticket it is to brand, which thermal print head may incorrectly brand the gaming ticket.
Figure 11:
FIG. 11 shows a thermal print head and a gaming ticket according to an embodiment of the present invention, in which the thermal print head is wider than the ticket, resulting in a correctly branded gaming ticket.
Figure 11:
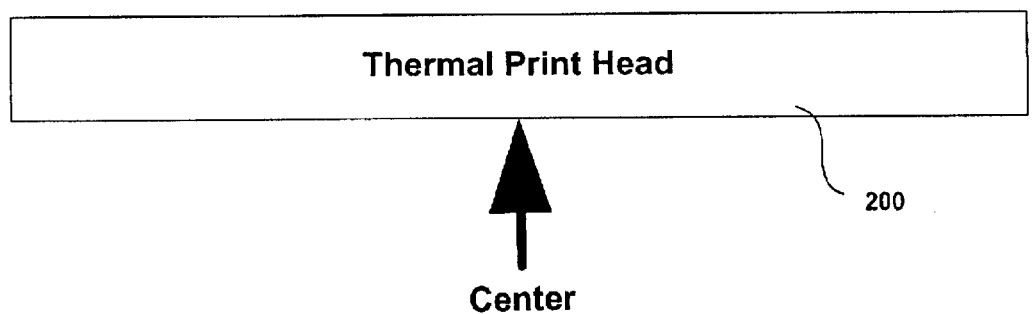

Although the branding scanner of the present invention may be fitted with means of preventing off centering of the document inserted into the scanner, re-inserting of the document by the operator until the document is perfectly centered is a nuisance. Moreover, if the document is excessively off center, the branding thereof may be less than optimal and may result in an incomplete or off center branding of the machine-readable code and/or off-center printing, a shown on the ticket 1000 of FIG. 10. The present invention addresses this problem by providing the branding scanner of the present invention with a thermal print head 200 that is substantially wider that the printable width of the document. As shown in FIG. 11, thermal print head 200 of the branding scanner of the present invention is wider than the ticket 1100. By providing a thermal print head 200 that is wider than the document 1100 inserted into the printer (or at least wider than the zone on the document in which the printing is to take place), any offset detected during the scan may be compensated by software in order to correspondingly shift the print pixels and print a perfectly centered brand on the document. Therefore, even if the operator does not insert the document 302, 1100 into the branding scanner of the present invention in a perfectly centered manner, the off-centering may be compensated for in software, as the off-centering may be detected during processing of the scanned image thereof and the print may be appropriately pixel shifted in order to achieve a perfectly centered brand and print of the off-center document inserted into the branding scanner.

Figure 12:
FIG. 12 shows the image of a skewed gaming ticket, as captured by a scanner contact image sensor.
Figure 13:
FIG. 13 shows the less than optimal branding that may occur when the gaming ticket is excessively skewed, using a conventional branding scanner.
Figure 14:
FIG. 14 shows an optimally branded skewed gaming ticket obtained when branding the gaming ticket using a branding document scanner according to the present invention.

A ticket printed on thermal paper is not an ideal medium for handling and achieving perfect scanning. Some of the problems associated with such tickets are that the tickets are often printed on low quality and thin thermal paper, they are narrow in width (about 80 mm, for example), they may be non-standard and variable in length, the paper may have curled, the paper may not have been cleanly cut, the paper may have been carelessly handled by the player and wrinkled, soiled and/or ripped and may have been subjected to humidity and sweat, to name a few. FIG. 12 shows an image of a skewed ticket 1200 captured by the CIS 100 of the branding scanner of the present invention. Although the scanner may be fitted with means of preventing skew (as detailed in U.S. Pat. No. 6,034,784, for example) and although the operator may have re-inputted the ticket into the scanner, some skew as shown in FIG. 12 may persist due to one or more of the reasons listed above. As shown at FIG. 13, such skew may result in an imperfectly branded and/or printed ticket 1300. Although the ticket 1300 been effectively branded, the branding is undesirably skewed relative to the ticket 1300. However, the branding scanner according to the present invention, by using a thermal print head 200 with a print width that is substantially wider than the document (and/or wider than a print zone and/or printable area on the ticket), the skew detected during the scan may be compensated by software in order to rotate the image to be printed, to thereby print a perfectly centered brand on the ticket 1400, as shown at FIG. 14.

While the foregoing detailed description has described preferred embodiments of the present invention, it is to be understood that the above description is illustrative only and not limiting of the disclosed invention. For example, image sensors other than of the CIS-type or printers other than the thermal type may be used within the context of the present invention. Still other modifications may occur to those of skill in this art. Thus, the present invention to be limited only by the claims as set forth below.

What is claimed is:

1. A document image stunner, comprising:
   a feed roller;
   an image sensor adapted to sense an image of a document inserted in the scanner while the image sensor presses the document against the feed roller; and
   a printer adapted to print an indicium on the document while the printer presses the document against the feed roller.

2. The document scanner of claim 1, wherein the printer is adapted to selectively assume a printing position in which the printer is positioned to print the indicium on the document and a non-printing position away from the printing position.

3. The document scanner of claim 1, wherein the feed roller is adapted to feed the document to both the image sensor and to the printer.

4. The document scanner of claim 1, wherein the image sensor includes a contact Image Sensor (CIS).

5. The document scanner of claim 1, wherein the printer includes a thermal print head.

6. The document image scanner of claim 1, wherein the printer includes a print head that is wider than the document inserted in the document scanner.

7. The document image scanner of claim 2, wherein the printer is pivotally coupled to a hinge and wherein the document is caused to at least partially wrap around the feed roller when the printer is pivoted to the printing position.

8. The document image scanner of claim 2, wherein the printer is pivotally coupled to a hinge and wherein the document is substantially tangent to an outer surface of the feed roller when the printer is pivoted to the non-printing position.

9. The document image scanner of claim 1, wherein the document includes an initially machine readable marking thereon and wherein the indicia printed by the printer renders the marking unreadable.

10. A method of capturing an image of a document and branding the document, comprising the steps of:
    scanning the image of the document using an image sensor while the image sensor presses the document against a feed roller; and
    branding the document by printing an indicium thereon using a printer while the printer presses the document against the feed roller.

11. The method of claim 10, wherein the document is a gaming ticket that includes an initially machine readable marking thereon and wherein the branding step renders the marking unreadable.

12. A document image scanner, comprising a feed roller, an image sensor and a printer, wherein both the image sensor and the printer apply pressure against the feed roller when the printer is in operation.

13. The document image scanner of claim 12, wherein the printer is adapted to selectively assume a printing position in which the printer is positioned to print an indicium on a document inserted in the document image scanner and a non-printing position away from the printing position.

14. The document image scanner of claim 12, wherein the feed roller is configured to feed a document inserted into the document image scanner to both the image sensor and to the printer.

15. The document image scanner of claim 12, wherein the image sensor includes a contact Image Sensor (CIS).

16. The document image scanner of claim 12, wherein the printer includes a thermal print head.

17. The document image scanner of claim 12, wherein the printer includes a print head that is wider than the document inserted in the document scanner.

18. The document image scanner of claim 13, wherein the printer is pivotally coupled to a hinge and wherein the document is caused to at least partially wrap around the feed roller when the printer is pivoted to the printing position.

19. The document image scanner of claim 13, wherein the printer is pivotally coupled to a hinge and wherein the document is substantially tangent to an outer surface of the feed roller when the printer is pivoted to the non-printing position.

20. The document image scanner of claim 13, wherein the document includes an initially machine readable marking thereon and wherein the indicia printed by the printer renders the marking unreadable.

* * * * *

UNITED STATES PATENT AND TRADEMARK OFFICE
CERTIFICATE OF CORRECTION

PATENT NO. : 6,732,920 B2 Page 1 of 1
APPLICATION NO. : 09/782839
DATED : May 11, 2004
INVENTOR(S) : Jean-Marie Gatto and Thierry Brunet De Courssou It is certified that error appears in the above-identified patent and that said Letters Patent is hereby corrected as shown below:

Column 8, line 2, replace "stunner" with -- scanner --.

Signed and Sealed this

Twenty-ninth Day of May, 2007

JON W. DUDAS
*Director of the United States Patent and Trademark Office*